(12) United States Patent
Saito

(10) Patent No.: US 7,827,612 B2
(45) Date of Patent: Nov. 2, 2010

(54) MALICIOUS-PROCESS-DETERMINING METHOD, DATA PROCESSING APPARATUS AND RECORDING MEDIUM

(75) Inventor: Kazunori Saito, Osaka (JP)

(73) Assignee: Secure Ware Inc., Osaka (JP)

( * ) Notice: Subject to any disclaimer, the term of this patent is extended or adjusted under 35 U.S.C. 154(b) by 1130 days.

(21) Appl. No.: 11/211,735

(22) Filed: Aug. 26, 2005

(65) Prior Publication Data

US 2005/0283838 A1 Dec. 22, 2005

Related U.S. Application Data

(63) Continuation of application No. PCT/JP2004/002310, filed on Feb. 26, 2004.

(30) Foreign Application Priority Data

Feb. 26, 2003 (JP) ............................ 2003-049912

(51) Int. Cl.
*G06F 12/14* (2006.01)
(52) U.S. Cl. ..................... 726/24; 726/22; 726/23; 726/26; 726/27; 726/30
(58) Field of Classification Search ................. None
See application file for complete search history.

(56) References Cited

U.S. PATENT DOCUMENTS 5,826,013 A * 10/1998 Nachenberg ................. 726/22
6,058,372 A * 5/2000 Sweet et al. ................. 705/16
6,301,699 B1 * 10/2001 Hollander et al. ............ 717/131
6,405,303 B1 * 6/2002 Miller et al. ................. 712/210
6,832,302 B1 * 12/2004 Fetzer et al. ................. 711/170
7,360,076 B2 * 4/2008 Anand et al. ................. 713/151

FOREIGN PATENT DOCUMENTS

| JP | 1-237834 A | 9/1989 |
| JP | 9-319574 A | 12/1997 |
| JP | 11-167487 A | 6/1999 |

(Continued)

OTHER PUBLICATIONS

Endo et al., "Computer Virus to Vaccine tono Tatakai", Journal of Information Processing Society of Japan, vol. 39, No. 12, Dec. 15, 1998, Partial English Translation pp. 1-2, pp. 1215-1219.

(Continued)

*Primary Examiner*—Kaveh Abrishamkar
(74) *Attorney, Agent, or Firm*—Birch, Stewart, Kolasch and Birch, LLP

(57) ABSTRACT

A malicious-process-determining method, a data processing apparatus, and a recording medium according to the present invention each consists of reading the data stored in a buffer memory by one byte, and for a plurality of instruction sequences each having a different read address, sequentially analyzing what kind of instruction code is contained therein. When the int instruction is contained in the analyzed instruction sequence, the number of times the immediate value is pushed to the stack is greater than 1, and the character code corresponding to "/" is contained in the virtual stack, a determination is made that a malicious code is contained in the relevant instruction sequence.

11 Claims, 13 Drawing Sheets

FOREIGN PATENT DOCUMENTS

| | | |
|---|---|---|
| JP | 2001-508564 A | 6/2001 |
| JP | 2001-344128 A | 12/2001 |

OTHER PUBLICATIONS

"Symantec Anti-Virus Research Center, SARC, no Shotai", ASCII Network Technology, vol. 3, No. 12, Dec. 1, 1998, Partial English Translation pp. 1, pp. 216-219.

Hukuda, "Tsugino Itteha Korede Kimari ! Network Security Keiko to Taisaku", Software Design, No. 143, Sep. 18, 2002, Partial English Translation pp. 1-3, pp. 29-37.

Andoh, "Virus Taisaku Saizensen", Nikkei Internet Solutions, No. 65, Nov. 22, 2002, Partial English Translation pp. 1 and 3, pp. 68-81.

Eitaro Saito, 2001 Nen Han "Virus Daizukan", Nikkei Network, No. 16, Jul. 22, 2001, pp. 59-85.

* cited by examiner

FIG. 2
(1) RECEPTION OF DATA
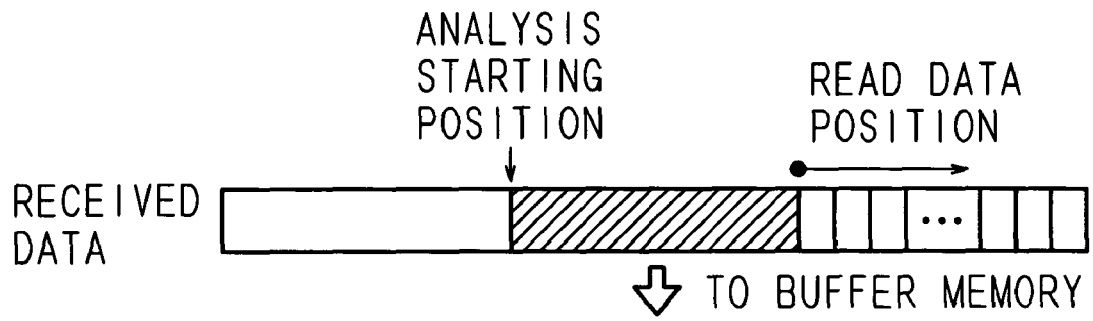
⇩ TO BUFFER MEMORY
(2) EXTRACTION OF DATA TO BE ANALYZED
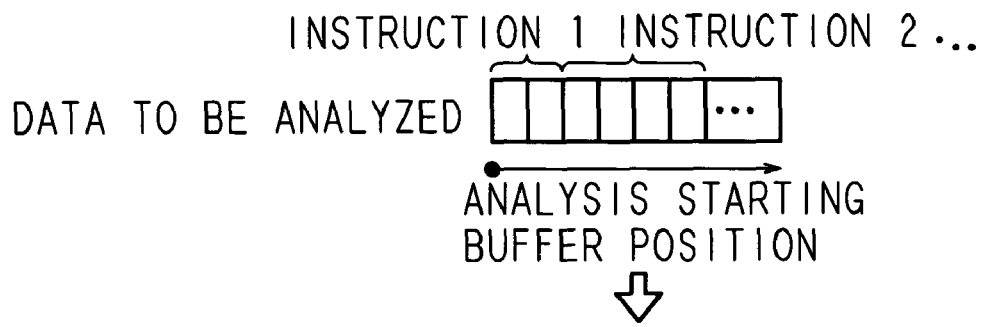
⇩
(3) ANALYSIS OF A PLURALITY OF
    INSTRUCTION SERIES
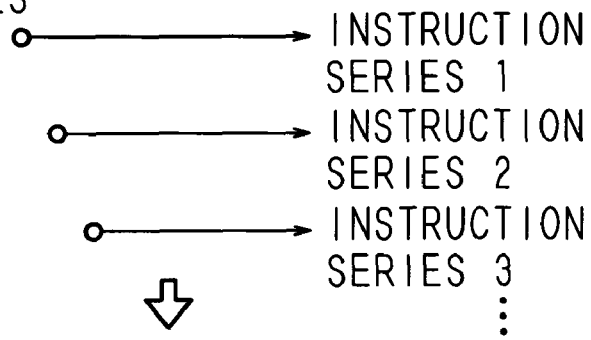
⇩
(4) DETECTION OF MALICIOUS CODE
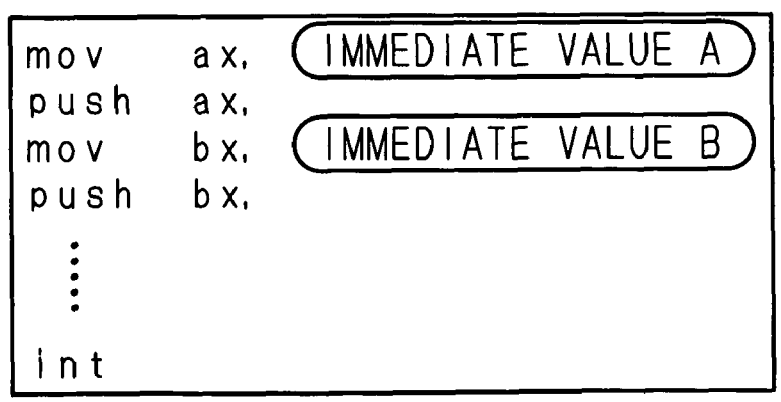

```
0x8053fd3 <shellcode+211>:   push   $0x68732f6e
0x8053fd8 <shellcode+216>:   push   $0x69622f2f
0x8053fdd <shellcode+221>:   mov    %esp,%ebx
0x8053fdf <shellcode+223>:   push   %eax
0x8053fe0 <shellcode+224>:   push   %ebx
0x8053fe1 <shellcode+225>:   mov    %esp,%ecx
0x8053fe3 <shellcode+227>:   push   %eax
0x8053fe4 <shellcode+228>:   push   %ecx
0x8053fe5 <shellcode+229>:   push   %ebx
0x8053fe6 <shellcode+230>:   push   %eax
0x8053fe7 <shellcode+231>:   mov    $0x3b,%al
0x8053fe9 <shellcode+233>:   int    $0x80
```

(b)

<shellcode+211> ⇒ 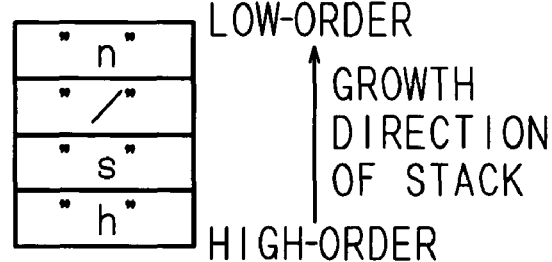

<shellcode+216> ⇒ 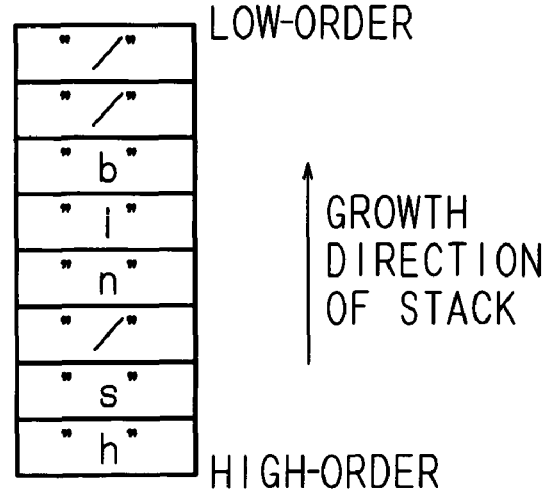

```
0x80494e0  <bsdcode>:      sub    %eax, %eax
0x80494e2  <bsdcode+2>:    push   %eax
0x80494e3  <bsdcode+3>:    mov    $0x17, %al
0x80494e5  <bsdcode+5>:    push   %eax
0x80494e6  <bsdcode+6>:    int    $0x80
0x80494e8  <bsdcode+8>:    sub    %eax, %eax
0x80494ea  <bsdcode+10>:   push   %eax
0x80494eb  <bsdcode+11>:   mov    $0x68736966, %edi
0x80494f0  <bsdcode+16>:   sub    %esi, %esi
0x80494f2  <bsdcode+18>:   mov    $0x4649, %si
0x80494f6  <bsdcode+22>:   xor    %edi, %esi
0x80494f8  <bsdcode+24>:   push   %esi
0x80494f9  <bsdcode+25>:   mov    $0x61a0b49, %esi
0x80494fe  <bsdcode+30>:   xor    %edi, %esi
0x8049500  <bsdcode+32>:   push   %esi
0x8049501  <bsdcode+33>:   mov    %esp, %ebx
0x8049503  <bsdcode+35>:   push   %eax
0x8049504  <bsdcode+36>:   push   %esp
0x8049505  <bsdcode+37>:   push   %eax
0x8049506  <bsdcode+38>:   push   %esp
0x8049507  <bsdcode+39>:   push   %ebx
0x8049508  <bsdcode+40>:   mov    $0x3b, %al
0x804950a  <bsdcode+42>:   push   %eax
0x804950b  <bsdcode+43>:   int    $0x80
```

(b)

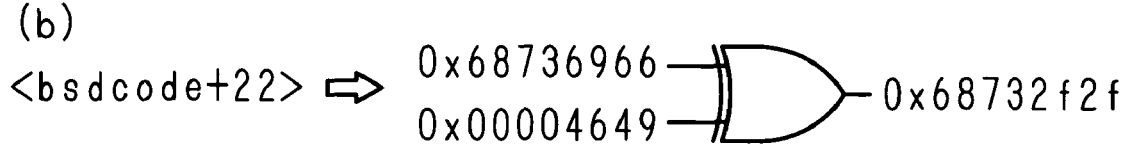

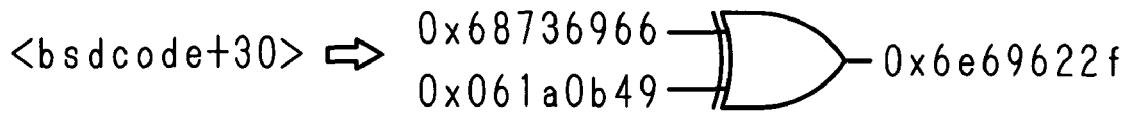

| <bsdcode+32> | 2f | 62 | 69 | 6e | 2f | 2f | 73 | 68 |
|---|---|---|---|---|---|---|---|---|
| | "/" | "b" | "i" | "n" | "/" | "/" | "s" | "h" |

# MALICIOUS-PROCESS-DETERMINING METHOD, DATA PROCESSING APPARATUS AND RECORDING MEDIUM

CROSS-REFERENCE TO RELATED APPLICATIONS

This application is a Continuation of copending PCT International Application No. PCT/JP2004/002310 filed on Feb. 26, 2004, which designated the United States, and on which priority is claimed under 35 U.S.C. §120. This application also claims priority under 35 U.S.C. §119(a) on Patent Application No(s). 2003-049912 filed in Japan on Feb. 26, 2003. The entire contents of each of the above documents is hereby incorporated by reference.

TECHNICAL FIELD

The present invention relates to: a malicious-process-determining method for detecting data which executes a malicious process; a data processing apparatus; and a computer-readable recording medium for recording a computer program for realizing the data processing apparatus.

BACKGROUND TECHNIQUE

Along with the popularization of the Internet network, various kinds of information processing apparatuses have become target of an attack such as computer virus and cracking and tend more to be exposed to such a menace. In cases of recent years, for example, computer virus typified by "Nimda" and "Code Red", which self-propagates using vulnerability (security hole) of an application program such as a system program or a web browser, has caused serious damage.

In an attack mentioned above by computer virus, cracking and the like, attack data including an instruction code for performing a malicious process (hereinafter referred to as a malicious code) is transmitted to an information processing apparatus such as a server apparatus and a personal computer which is the target of the attack, so that the instruction code is executed at the information processing apparatus. There are a variety of such attack techniques and an attack technique by buffer overflow is known as one thereof. In buffer overflow, when a buffer secured in a stack falls into a buffer overflow state where writing is performed at a stack area larger than the secured buffer, unexpected variable destruction is caused which may lead to malfunction of a program. In an attack by buffer overflow, malfunction of a program is caused intentionally so as to obtain administrator authorization of a system, for example.

In order to cope with these attacks such as computer virus and cracking, as described in Japanese Patent Application Laid-Open No. H9-319574, for example, a process of detecting presence of a particular bit pattern to be found in a malicious code is performed for received data. When such a bit pattern is included in received data, it is determined that the data is attack data including a malicious code, and rejection of data, annunciation to the user and the like are performed.

Accordingly, in order to cope with a variety of attacks such as computer virus and cracking with a conventional technique, it is necessary to prepare and store a particular bit pattern corresponding to each computer virus and cracking in a database, and the database must be updated to cope with a case where new computer virus or cracking technique is found.

In a conventional detecting method for attack data, a known bit pattern is detected as described above, or the structure of a portion which is not essential for an attack process such as simple repetition of a NOP (non-operation) instruction is detected. Accordingly, the method is vulnerable to variation of attack data and it is necessary to update a database of bit patterns used for detection every time unknown attack data arises, arousing concern over time lug before the database is updated.

The present invention, in view of the above situation, aims to provide a malicious-process-determining method, a data processing apparatus and a computer-readable recording medium recorded a computer program for realizing the data processing apparatus where, for a plurality of data sequence each composed of a contiguous sequence of byte strings and have a first byte corresponding to a different read address, detecting whether each of data sequences generate a plurality of character codes configuring a command name of an external command, and determining whether the process of each data sequence is a malicious process based on the detection result, thereby performing detection on an unknown instruction code group that performs a malicious process without preparing in advance a bit pattern and the like for detecting the instruction code group that performs the malicious process.

DISCLOSURE OF THE INVENTION

A method for determining malicious process according to the first invention relates to a malicious-process-determining method for determining whether or not a malicious process is executed based on instruction codes included in received data, using a data processing apparatus comprising receiving means for receiving data including a plurality of instruction codes having different byte lengths and storing means for storing received data, characterized by comprising the steps of reading data stored in the storing means sequentially by one byte; detecting whether an instruction code that is contained in each of data sequences, which are respectively composed of a contiguous sequence of byte strings and have a first byte corresponding to a different read address, generate a plurality of character codes configuring a character string used for executing the malicious process; and determining whether an external command, which is described by the character string, is executed or not based on the detection result.

A data processing apparatus according to the second invention relates to a data processing apparatus comprising receiving means for receiving data including a plurality of instruction codes having different byte lengths, storing means for storing received data and determining means for determining whether or not a process to be executed is a malicious process based on the instruction codes included in stored data, characterized by comprising: means for reading data stored in the storing means sequentially by one byte; and detection means for detecting whether an instruction code that is contained in each of data sequences, which are respectively composed of a contiguous sequence of byte strings and have a first byte corresponding to a different read address, generate a plurality of character codes configuring a character string used for executing the malicious process; wherein determining means determines whether an external command, which is described by the character string, is executed or not based on the detection result of the detection means.

The data processing apparatus according to the third invention relates to the data processing apparatus according to the second invention further comprising a table storing the relationship between data of the first byte of the instruction code and the byte length of the instruction code.

The data processing apparatus according to the fourth invention relates to the data processing apparatus according to the second invention further comprising means for detecting whether an instruction code for activating a system call is located after the instruction code for generating the character codes, wherein when the instruction code is detected, determining means determines that the malicious process is executed.

The data processing apparatus according to the fifth invention relates to the data processing apparatus according to the fourth invention further comprising means for detecting whether a predetermined character code is contained in the character codes, wherein when the predetermined character code is detected, determining means determines that the malicious process is executed.

The data processing apparatus according to the sixth invention relates to the data processing apparatus according to the second invention, wherein the character code generated by the instruction code contained in the data sequence corresponds to an immediate value contained in the data.

The data processing apparatus according to the seventh invention relates to the data processing apparatus according to the second invention further comprising means for notifying information to the outside when the determining means determines that the malicious process is executed.

A data processing apparatus according to the eighth invention relates to a data processing apparatus comprising receiving section for receiving data including a plurality of instruction codes having different byte lengths; a memory for storing received data; and a controller capable of performing operations of: reading data stored in the memory sequentially by one byte; detecting whether an instruction code that is contained in each of data sequences, which are respectively composed of a contiguous sequence of byte strings each and have a first byte corresponding to a different read address, generate a plurality of character codes configuring a character string used for executing the malicious process; and determining whether an external command is executed or not based on the detection result.

The data processing apparatus according to the ninth invention relates to the data processing apparatus according to the eighth invention, wherein said controller is further capable of performing an operation of detecting whether an instruction code for activating a system call is located after the instruction code for generating the character codes.

The data processing apparatus according to the tenth invention relates to the data processing apparatus according to the ninth invention, wherein said controller is further capable of performing an operation of detecting whether a predetermined character code is contained in the character codes.

A recording medium readable on a computer according to a eleventh invention relates to a computer-readable recording medium recorded a computer program comprising a step of causing a computer to determine whether or not a malicious process is executed based on data including a plurality of instruction codes having different byte lengths, wherein the recorded computer program comprising the steps of: causing the computer to detect whether an instruction code that is contained in each of data sequences, which are respectively composed of a contiguous sequence of byte strings and have a first byte corresponding to a different read address, generate a plurality of character codes configuring a character string used for executing the malicious process.

According to the present invention, when sequentially reading the data from the storing means by one byte and determining whether the instruction code that executes a malicious process is contained therein, with regards to a plurality of data sequence having different read addresses, detection is made whether to generate the character string used when executing the malicious process such as, external command and parameter to be passed to the system call. Therefore, by performing detection focusing on the universal structure that is not seen in the usual data (executable code), the unknown malicious code, when appeared, could be responded to as long as the essential processing content of the malicious code is not changed. In the present invention, detection is performed for every instruction code, and thus the detection result may differ depending on where the starting position of the detection is set, but since detection is performed on a plurality of data series, which read position is sequentially differed, the erroneous determination is reduced and the detection precision is enhanced.

According to the present invention, since a table storing the correspondent relationship between the data of the first byte of the instruction code and the byte length of the instruction code is provided, when the read address of the data is positioned at a position other than the first byte of the instruction code in an instruction series, detection of the malicious code is not performed and thus the processing speed is improved.

According to the present invention, detection of whether the instruction code that activates the system call is contained after the instruction code that executes the process for generating the character code is performed, the parameter made up of the generated character code is most probably passed to the system call, and thus is determined that the instruction code that executes the malicious process is contained.

According to the present invention, determination is made whether a predetermined character code is contained in the generated character code, and thus the detection precision is enhanced.

According to the present invention, the character code to be generated is corresponded to the immediate value in the data, and thus by monitoring the register region and the stack region, the presence of malicious code is easily detected, and the detection precision is enhanced.

According to the present invention, when determined that the detected data sequence is the data that executes a malicious process, such fact is externally notified. Therefore, at the point the malicious code is detected, shutting of communication and the like is performed, thereby preventing disadvantages caused by the malicious code.

BRIEF DESCRIPTION OF THE DRAWING

FIG. 2 is a schematic view for explaining a process to be executed by the data processing apparatus;

FIG. 7 is a schematic view for explaining one example of the malicious code;

FIG. 8 is a schematic view for explaining another example of the malicious code;

BEST EMBODIMENT FOR IMPLEMENTING THE INVENTION

The following description will explain the present invention in the concrete with reference to the drawings illustrating some embodiments thereof.

First Embodiment

Figure 1:
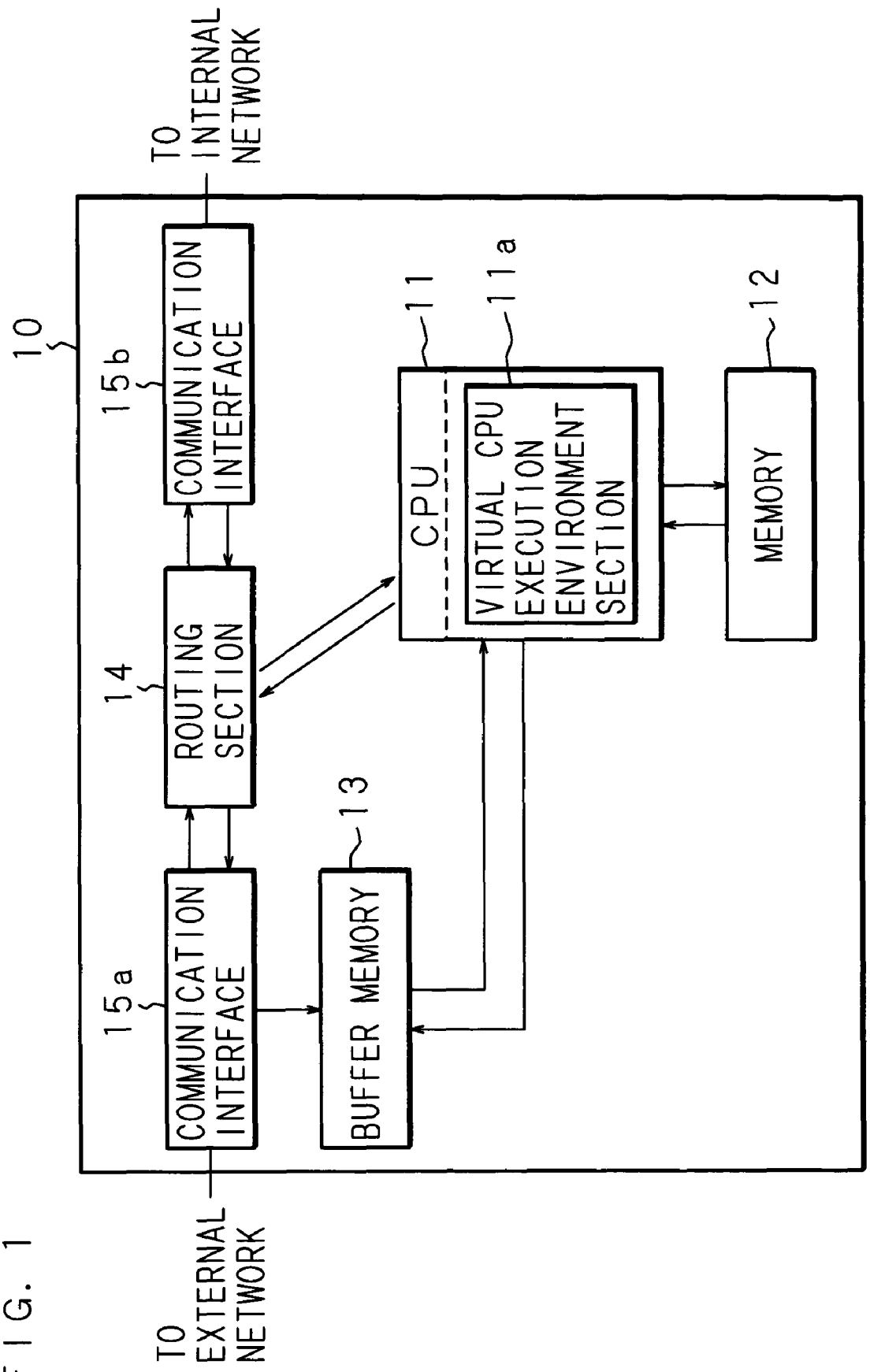
FIG. 1 is a block diagram of a data processing apparatus according to the present embodiment.

FIG. 1 is a block diagram of a data processing apparatus according to the present embodiment. Denoted at 10 in the figure is a data processing apparatus, which comprises a CPU 11, a communication interface 15a to be connected with an external network and a communication interface 15b to be connected with an internal network. The data processing apparatus 10 is an apparatus, such as a router, a broadband router or a switch, for relaying data which is transmitted and received on a communication network. The communication interface 15a is connected with an information processing apparatus, a communication device and the like, which are communication targets, via the external network and the communication interface 15b is connected with an information processing apparatus, a communication device and the like, which are used by users, via the internal network. The information processing apparatus includes a personal computer, a workstation, a server apparatus, a PDA (Personal Digital Assistant) and the like, and the communication device includes a mobile telephone and the like.

The CPU 11 is connected with hardware such as a memory 12, a buffer memory 13 and a routing section 14 and controls each hardware mentioned above by reading and executing a control program which is prestored in the memory 12 so as to cause the apparatus to operate as an apparatus for relaying various kinds of data which is transmitted and received between the external network and the internal network. The memory 12 stores, in addition to the control program for operating each hardware, a routing table for storing a destination network address for deciding a communication path and a computer program of the present invention.

When the communication interface 15b of the data processing apparatus 10 receives data which is transmitted from the internal network side to the external network side, the CPU 11 refers to the routing table stored in the memory 12 to decide the communication path and controls the routing section 14 according to the decided communication path. The CPU 11 then transmits data to an information processing apparatus or a communication device, which is the destination, via the communication interface 15a.

Moreover, data which is transmitted from the external network side to the internal network side is relayed by the data processing apparatus 10 according to the procedure similar to the one described above. Here, the data processing apparatus 10 stores data from the external network side received at the communication interface 15a temporarily in the buffer memory 13 and analyzes the stored data, so as to determine whether or not the data includes an instruction code (hereinafter referred to as a malicious code) for causing a particular CPU (hereinafter referred to as a CPU to be protected) to execute a malicious process. In analysis and determination of data stored in the buffer memory 13, the CPU 11 reads a computer program of the present invention from the memory 12 and executes the program, and creates a virtual CPU execution environment section 11a for giving an environment for analysis and determination of data inside thereof. The virtual CPU execution environment section 11a that comprises a virtual register and a virtual stack and the like, which are corresponding to a register and a stack to be used by a CPU to be protected, interprets data to be analyzed as an instruction code of the CPU to be protected, virtually decodes the data and stores a parameter and the like generated at the time. The CPU 11 then determines presence of a malicious code by monitoring the state or the like of the virtual register and the virtual stack provided at the virtual CPU execution environment section 11a.

It should be noted that, although the CPU 11, the memory 12 and the buffer memory 13 are respectively provided separately in the present embodiment, an ASIC (Application Specified IC) or the like having a buffer memory and an IC (Integrated Circuit) storing a computer program of the present invention mounted on one chip may be provided.

FIG. 2 is a schematic view for explaining a process to be executed by the data processing apparatus 10. The process to be executed by the data processing apparatus 10 is divided broadly into (1) the reception of data from the external network, (2) the extraction of data to be analyzed, (3) the analysis of a plurality of instruction series derived from data to be analyzed and (4) the detection of a malicious code in each instruction series. The following description will explain each process.

(1) Reception of Data

The communication interface 15a of the data processing apparatus 10 receives data in a predetermined unit (in packet, for example) according to the communication procedure compatible with the communication standard of the connected external network. Each unit of received data has a predetermined byte length and is composed of a communication header including address information of a source and a destination and user data which is arbitrarily created by the user. The user data includes an instruction code for executing a process required by the user and a malicious process may possibly be executed by this instruction code.

(2) Extraction of Data to be Analyzed

Therefore, the data processing apparatus 10 sequentially extracts received data by one byte, stores the data in the buffer memory 13 and makes an analysis. A position where extraction of data is started, i.e. an analysis starting position, can be an arbitrary preset position. For example, a first byte of received data may be the analysis starting position, or a first byte of user data excluding a communication header may be the analysis starting position. Moreover, the buffer size of the buffer memory 13 for storing data extracted as one to be analyzed is preset so that at least one instruction code having the largest instruction length among instruction codes which can be decoded by the CPU to be protected is stored.

(3) Analysis of a Plurality of Instruction Series

Next, data to be analyzed stored in the buffer memory 13 is analyzed while deriving a plurality of instruction series. Here, an instruction sequence means a series of instruction codes of a CPU to be protected starting from a position designated for data to be analyzed.

For analyzing data to be analyzed, the CPU 11 reads data sequentially by one byte starting from the first byte of the buffer memory 13. The CPU 11 interprets to a first byte of what type of instruction code the read one byte data corresponds in the CPU to be protected and stores the type of the instruction, the starting position of the next instruction and the parameter to be used by the instruction based on the interpretation result. In practice, a table (hereinafter referred to as an instruction table) defining a correspondence of a character code of a first byte of an instruction code to be used in the CPU to be protected in a computer program of the present invention to the instruction length of the instruction code, the parameter to be used and the like is provided and the instruction table is stored in the memory 12 when the CPU 11 loads the computer program of the present invention. The CPU 11 refers to the instruction table to interpret the one byte data read from the buffer memory 13.

After finishing interpretation of read one byte data, the CPU 11 further reads one byte of data while shifting the analysis starting buffer position corresponding to the read position from the buffer memory 13 by one byte and analyzes an instruction series having the read position of the read data as the first byte. By executing such a process repeatedly by shifting the analysis starting buffer position sequentially, a plurality of instruction series having different read positions are analyzed.

Moreover, on the analysis starting buffer position of the buffer memory 13 which has finished an analysis, data of the next read data position is stored from received data.

(4) Detection of Malicious Code

The CPU 11 of the data processing apparatus 10 detects an instruction series containing a instruction code that may generate a character string of an external command or a parameter for passing to the system call etc. based on the state or the like of the virtual register and the virtual stack included in the virtual CPU execution environment section 11*a* and when instruction series is detected, it is determined that the malicious code has been detected. The malicious code that generates the character string configuring the command name of the external command will now be explained below.

When creating on the stack a character string of a command name of an external command that an attacker desires to execute, for example, a method of directly pushing the immediate value on the stack and configurating the character string on the stack, a method of pushing the immediate value that has once been written in the register on the stack and configurating the character string on the stack, or a method of performing an arithmetic process using the immediate value written in the register and pushing the arithmetic result to the stack and configurating the character string on the stack is adopted.

In the example shown in FIG. 2, the immediate value A is written to the register ax by the mov instruction, and the written immediate value A is pushed on the stack by the push instruction. Similarly, the immediate value B is written in the register bx by the mov instruction, and the written immediate value B is pushed on the stack by the push instruction. By corresponding the immediate value A and the immediate value B to some kind of character code, the desired character string is created on the stack, and the created character string is executed as the external command.

Therefore, when detecting the instruction code group executing the above processes by the data processing apparatus 10, detection is made whether or not the character string of the external command that executes the malicious process is being created on the stack or not by monitoring the state of the register and the stack. In the present embodiment, the received data is interpreted as the instruction code of the CPU to be protected, and the state of the actual register and the stack is monitored by reflecting on the virtual stack and the virtual register in the virtual CPU execution environment section 11*a*.

Since the above mentioned instruction code group is not a general code generated by a compiler, when the data processing apparatus 10 detects such an instruction code group, it is determined that that malicious code is most probably contained therein.

Figure 3:
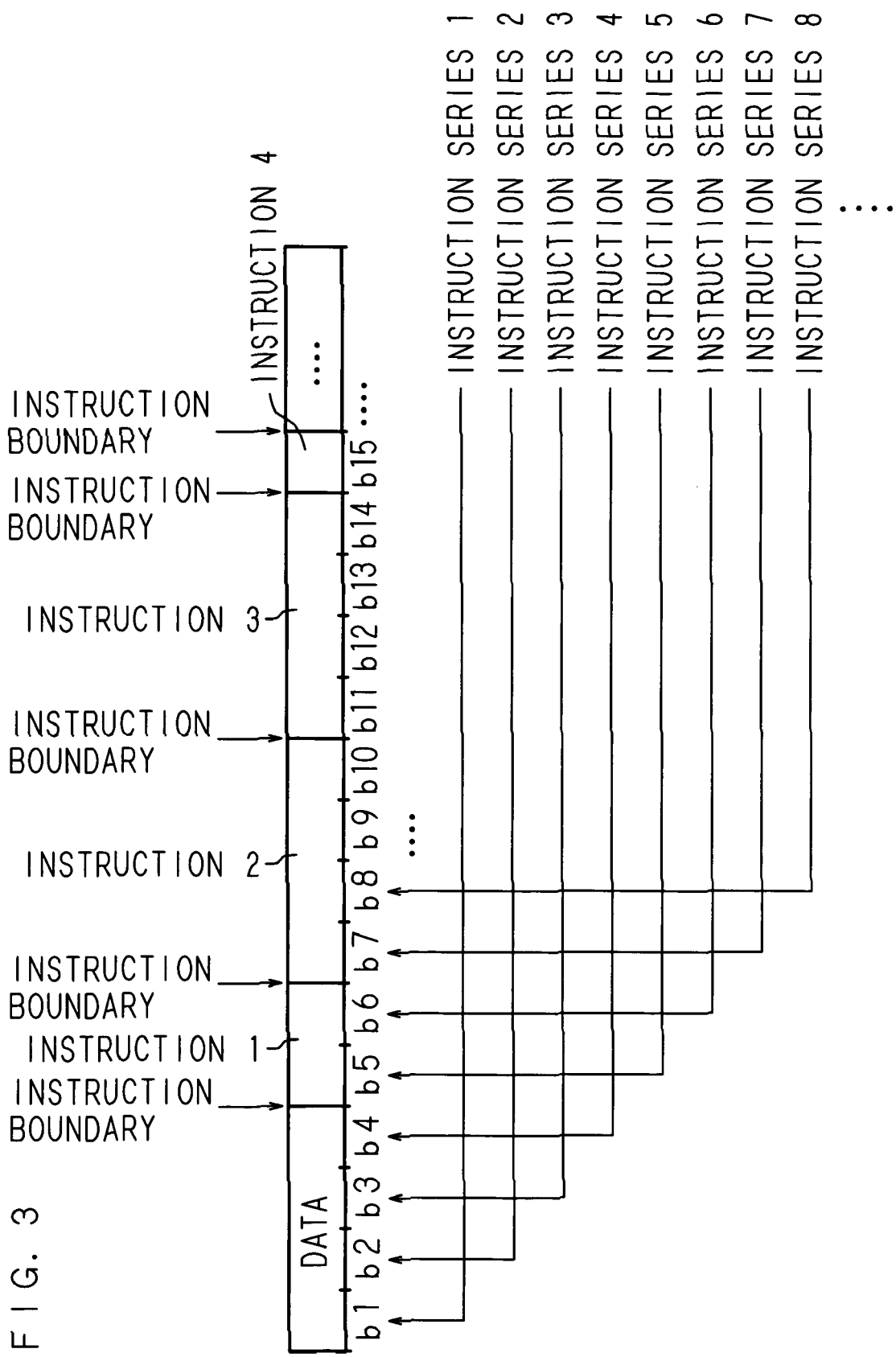
FIG. 3 is a schematic view for explaining the structure of data to be analyzed.

FIG. 3 is a schematic view for explaining the structure of data to be analyzed. The instruction length of an instruction code to be used in the CPU to be protected is not always constant and an instruction code having a variety of instruction length is sometimes used. Moreover, data to be received sometimes includes mere data, such as image data or document data, which is not an instruction code. Accordingly, when a read position of data to be analyzed is set inappropriately, an instruction code may possibly be interpreted improperly, causing determination mistake of presence of a malicious code.

Therefore, in the present embodiment, in order to properly grasp a boundary between mere data and an instruction code and a boundary (instruction boundary) between two instruction codes, data to be analyzed stored in the buffer memory 13 is read by one byte and analysis of data goes on considering read data as a first byte of an instruction code. By referring to the instruction table described above, the position of the next instruction code can be determined from read one byte data and therefore it becomes possible to sequentially grasp an instruction code and it is possible to interpret data to be detected as one series (instruction series) of a series of a plurality of instruction codes. Moreover, since interpretation is performed while shifting the read position of data by one byte, it is possible to sequentially derive a plurality of instruction series having different first byte position and it becomes possible to analyze an instruction series having a proper instruction boundary to be included in the instruction series.

The following description is concrete explanation using FIG. 3. Data to be analyzed shown in FIG. 3 is data including a series of mere data of four bytes starting from the first byte; an instruction code of two bytes (instruction 1); an instruction of four bytes (instruction 2); an instruction code of four bytes (instruction 3); an instruction code of one byte (instruction 4); . . . . First, the analysis starting buffer position is set to b1, one byte data is read, information of the instruction content, the position of the next instruction code, the parameter to be used for the instruction code and the like is obtained and analysis for an instruction series 1 having b1 as the first byte is started. Then, the analysis starting buffer position is sequentially shifted to b2, b3, b4, . . . to analyze in parallel an instruction series 2, an instruction series 3, an instruction series 4, . . . having each read position as the first byte. In the example shown in FIG. 3, an instruction series 5 having the position of b5 as the first byte is a series of a proper instruction code and it is determined that a malicious code has been detected when the "jmp→call" structure or the "call→pop" structure is detected in the analysis of the instruction series 5.

It should be noted that analysis of data can be omitted since a data series 7 starting from b7, a data series 11 starting from b11, a data series 15 starting from b15 and the like are included as a part of the data series 5.

Figure 4:
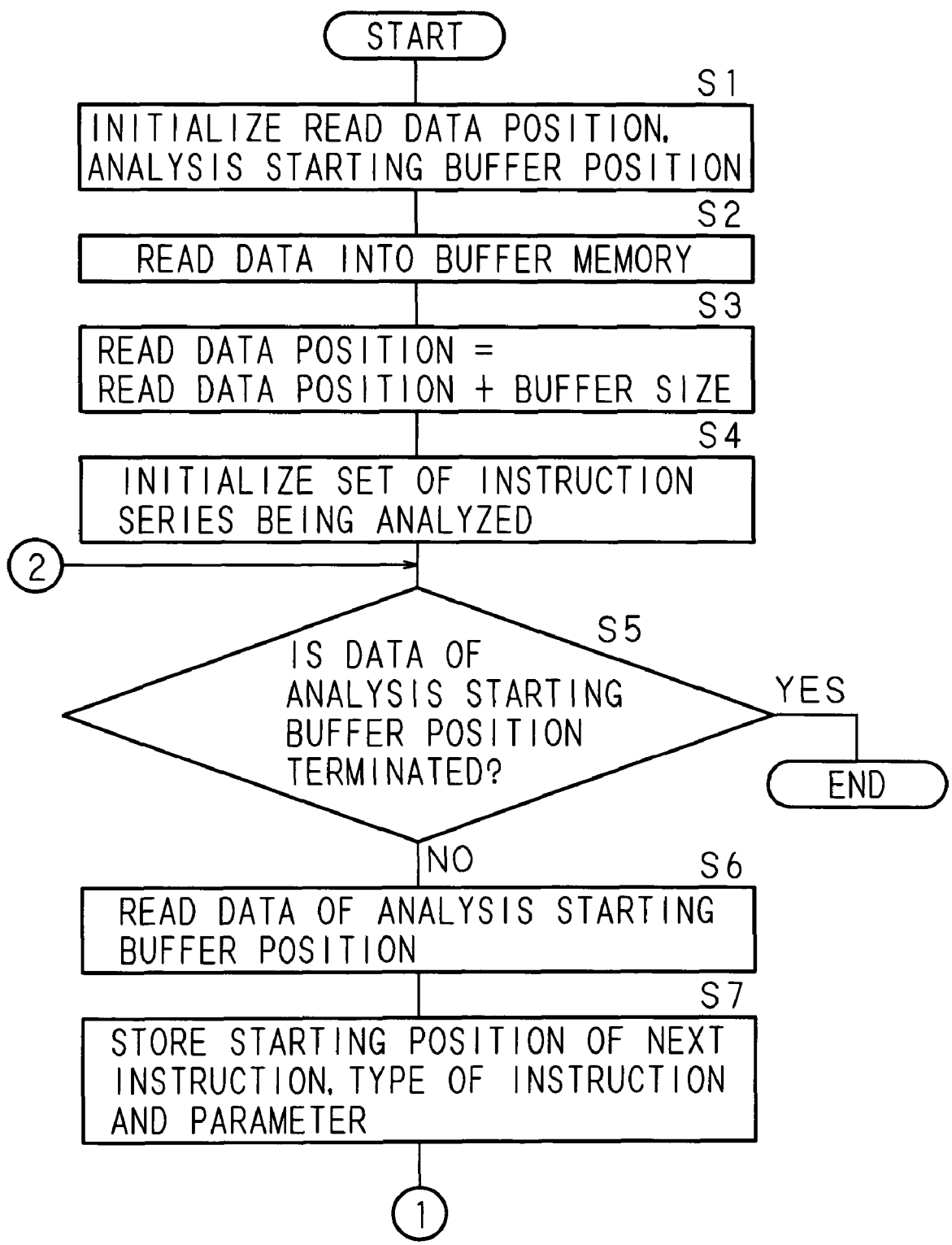
FIG. 4 is a flowchart for explaining the detection procedure of a malicious code by the data processing apparatus.
Figure 5:
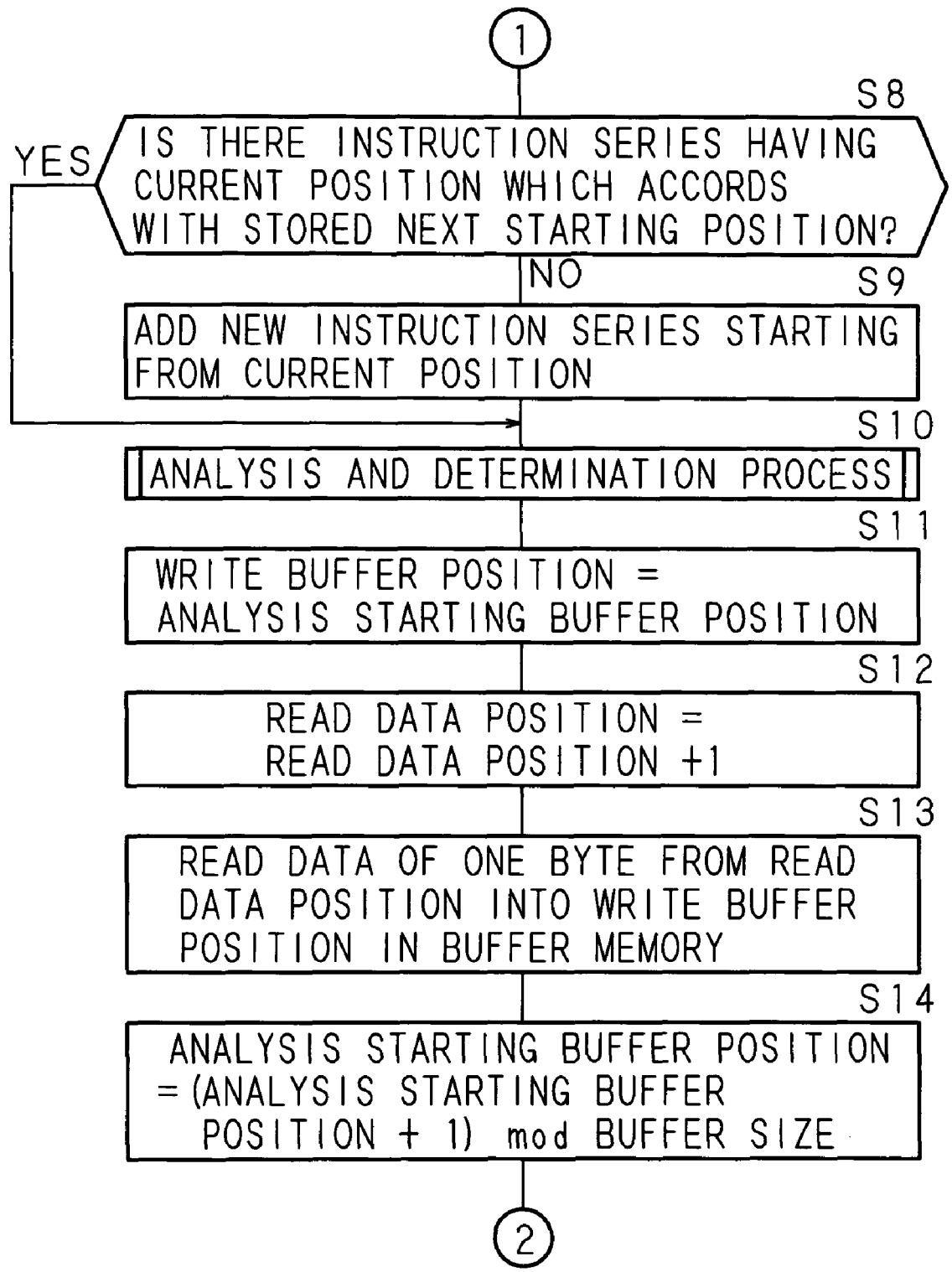
FIG. 5 is a flowchart for explaining the detection procedure of a malicious code by the data processing apparatus.

The following description will explain the detection procedure of a malicious code by the data processing apparatus 10. FIGS. 4 and 5 are flowcharts for explaining the detection procedure of a malicious code by the data processing apparatus 10. When data from the external network is received at the communication interface 15*a*, first of all, a read data position and an analysis starting position are initialized (step S1) and data is read into the buffer memory 13 (step S2). In this reading of initial stage, data is read only by the buffer size of the buffer memory 13. A position obtained by adding the buffer size to the read data position is then set as the next read data position (step S3). Moreover, when there is an instruction series in the course of analysis, a set of the instruction series is initialized (step S4).

It is then judged whether data of the analysis starting buffer position is termination of received data or not (step S5). A detection process of a malicious code of this flowchart is terminated when the data of the analysis starting buffer position is terminated (S5: YES), while data of one byte of the analysis starting buffer position is read (step S6) when the data of the analysis starting buffer position is not terminated (S5: NO). Then, the next instruction starting position, the type of the instruction and the parameter are obtained on the basis of the read one byte data and stored in the memory 12 (step S7).

The CPU 11 then judges whether or not there is an instruction series a current position of which accords with the stored next starting position in an instruction series in the course of analysis (step S8). When there is an instruction series a current position of which accords with the stored next starting position (S8: YES), an analysis and determination process which will be described below is executed for all instruction series (step S10).

When there is no instruction series a current position of which accords with the stored next starting position (S8: NO), an instruction series starting from the current position is added as a new instruction series to be a target of the analysis and determination process (step S9) and the analysis and determination process is executed (S10).

The write buffer position is then set as the analysis starting buffer position (step S11) and read data position is increased by one (step S12). Data of one byte is then read to the write buffer position in the buffer memory 13 from the read data position (step S13). A remainder obtained by dividing a value obtained by adding one analysis buffer position by the buffer size is then set as the next analysis starting buffer position (step S14), the process is returned to the step S5 and the analysis is made repeatedly.

Figure 6:
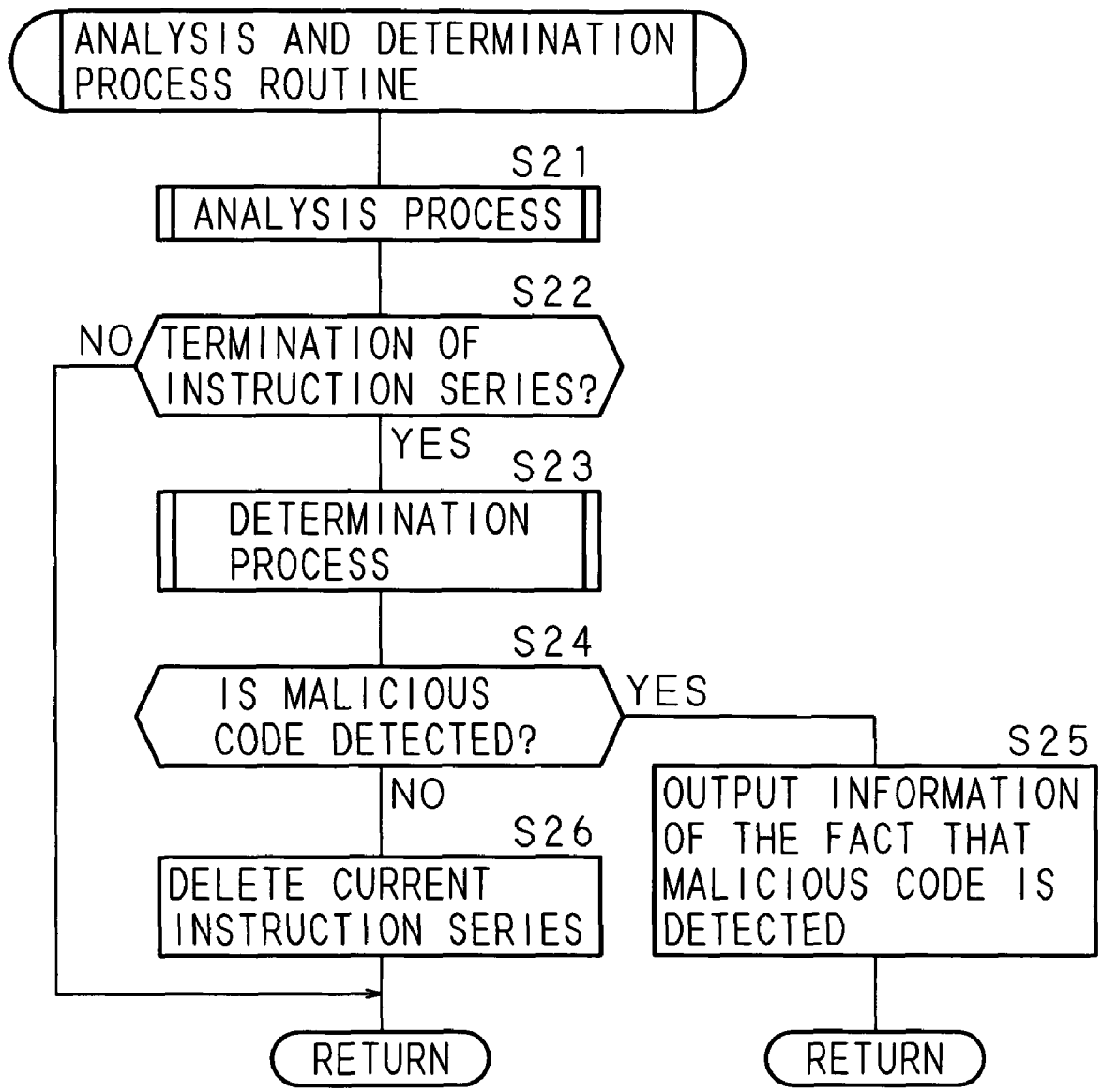
FIG. 6 is a flowchart for explaining the procedure of an analysis and determination process routine.

FIG. 6 is a flowchart for explaining the procedure of an analysis and determination process routine. An analysis process which will be described below is performed for all instruction series including one byte data read from the buffer memory 13 which corresponds to the first byte of the instruction code (step S21). Although the analysis process will be described below in detail, an analysis is made here by referring to an instruction table based on read one byte data to store the content of the instruction, the parameter to be used, the position of the next instruction and the like and monitoring the state in the virtual stack in the virtual CPU execution environment section 11a.

When the analysis process is terminated, the CPU 11 judges whether the analyzed instruction series has terminated or not (step S22), and terminates this analysis and determination process routine and goes to the process of the step S11 of FIG. 5 when the instruction series has not terminated (S22: NO).

Alternatively, when it is determined that the instruction series has terminated (S22: YES), a determination process which will be described below is performed (step S23). The CPU 11 then receives the result of the determination process and judges whether a malicious code has been detected or not (step S24), and deletes the current instruction series (step S26) when it is judged that no malicious code has been detected (S24: NO), or outputs information of the fact that a malicious code has been detected (step S25) when it is judged that a malicious code has been detected (S24: YES). Information may be outputted in a form of transmitting information to an information processing apparatus connected with the internal network via the communication interface 15b or in a form of providing a display unit for displaying information as character information or a light emitting unit for announcing information with light in the data processing apparatus 10 and outputting information thereto. Moreover, a process of breaking communication may be performed after outputting information of the fact that a malicious code has bee detected.

FIG. 7 is a schematic view for explaining one example of the malicious code. FIG. 7(a) shows one part of the actual malicious code. It is to be focused here that the immediate value (0x68732f6e) is pushed on the stack with the process of label <Shellcode+211> and the immediate value (0x69622f2f) is pushed on the stack with the process of label <Shellcode+216>.

That is, as shown in FIG. 7(b), when the process of label <Shellcode+211> is executed, the four bytes character string of "n", "/", "s", "h" in order from the low order side of the stack is created, and when the process of label <Shellcode+216> is executed, the eight bytes character string of "/", "/", "b", "i", "n", "/", "s", "h" in order from the low order side of the stack is created.

The function number used in the following int instruction is specified in the process of label <Shellcode+231>, the system call is called out in the process of label <Shellcode+233>, and the program (external command) specified in the created character string (//bin/sh) is executed.

FIG. 8 is a schematic view for explaining another example of the malicious code. FIG. 8(a) shows one part of the actual malicious code. In this example, two immediate values are written to the register by the process of label <bsdcode+11> and label <bsdcode+18>, respectively, the logical operation of the two immediate values is performed with the process of label <bsdcode+22>, and the result of the logical operation is pushed to the stack in the process of label <bsdcode+24>. The value of the register to be pushed to the stack at this step is 0x68732f2f, and the four bytes character string of "/", "/", "s", "h" in order from the low order of the stack is created (refer to FIG. 8(b)).

Further, the third immediate value (0x61a0b49) is written to the register by the process of label <bsdcode+25>, and in the process of label <bsdcode+30>, the logical operation with the immediate value written in the process of label <bsdcode+11> is performed and the result of the logical operation is pushed to the stack in the process of label <bsdcode+32>. The value of the register to be pushed to the stack at this step is 0x6e69622f, and the eight bytes character string of "/", "b", "i", "in", "/", "/", "s", "h" in order from the low order side of the stack is created (refer to FIG. 8(b)).

The function number to be used in the following int instruction is specified in the process of label <bsdcode+40>, the system call is called out in the process of label <bsdcode+43>, and the program (external command) by the created character string (/bin//sh) is executed.

The features common to the instruction code group shown in FIG. 7 and FIG. 8 is that (1) the immediate value is directly or indirectly pushed two or more times on the stack, (2) the int instruction is executed without execution of a call instruction. That is, a character string of an external command name that the attacker desires to execute is created on the stack by (1), and the system call is called out by (2) and the external command is executed. Since "/" indicating the delimiter of the pass is often included in the external command name, by imposing a condition of whether or not such character code is contained in the character string of the external command name, the error detection rate is reduced and the detection precision is enhanced. Further, the detection precision is further enhanced by further imposing a condition of whether or not 0x3b is used for the function number used in the int instruction.

In (2), when the call instruction is executed before the int instruction is executed, the created character string is interpreted as the parameter to be passed to the function of the calling destination, and thus cannot be determined as the malicious code.

Figure 9:
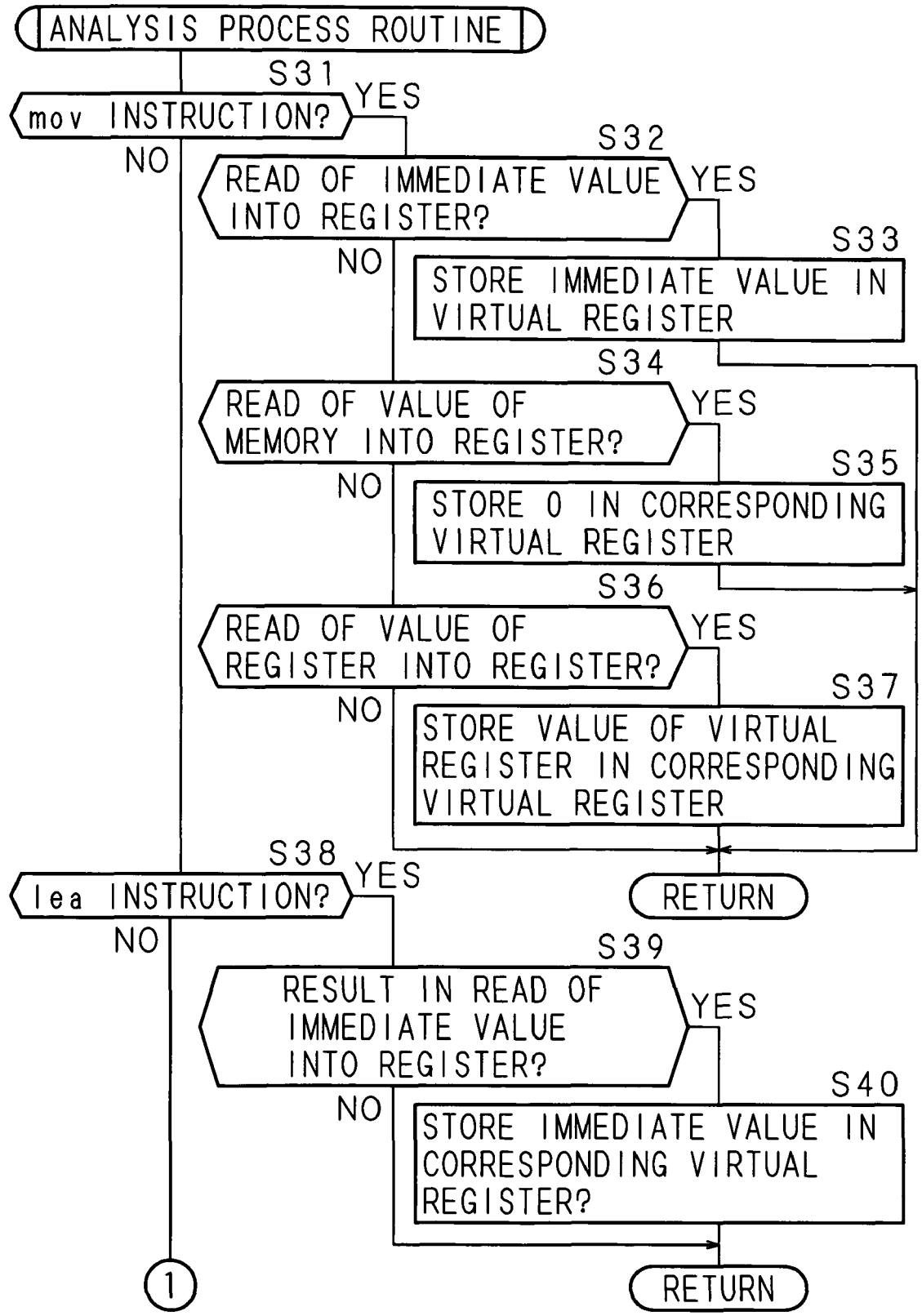
FIG. 9 is a flowchart for explaining the procedure of the analysis process routine.
Figure 10:
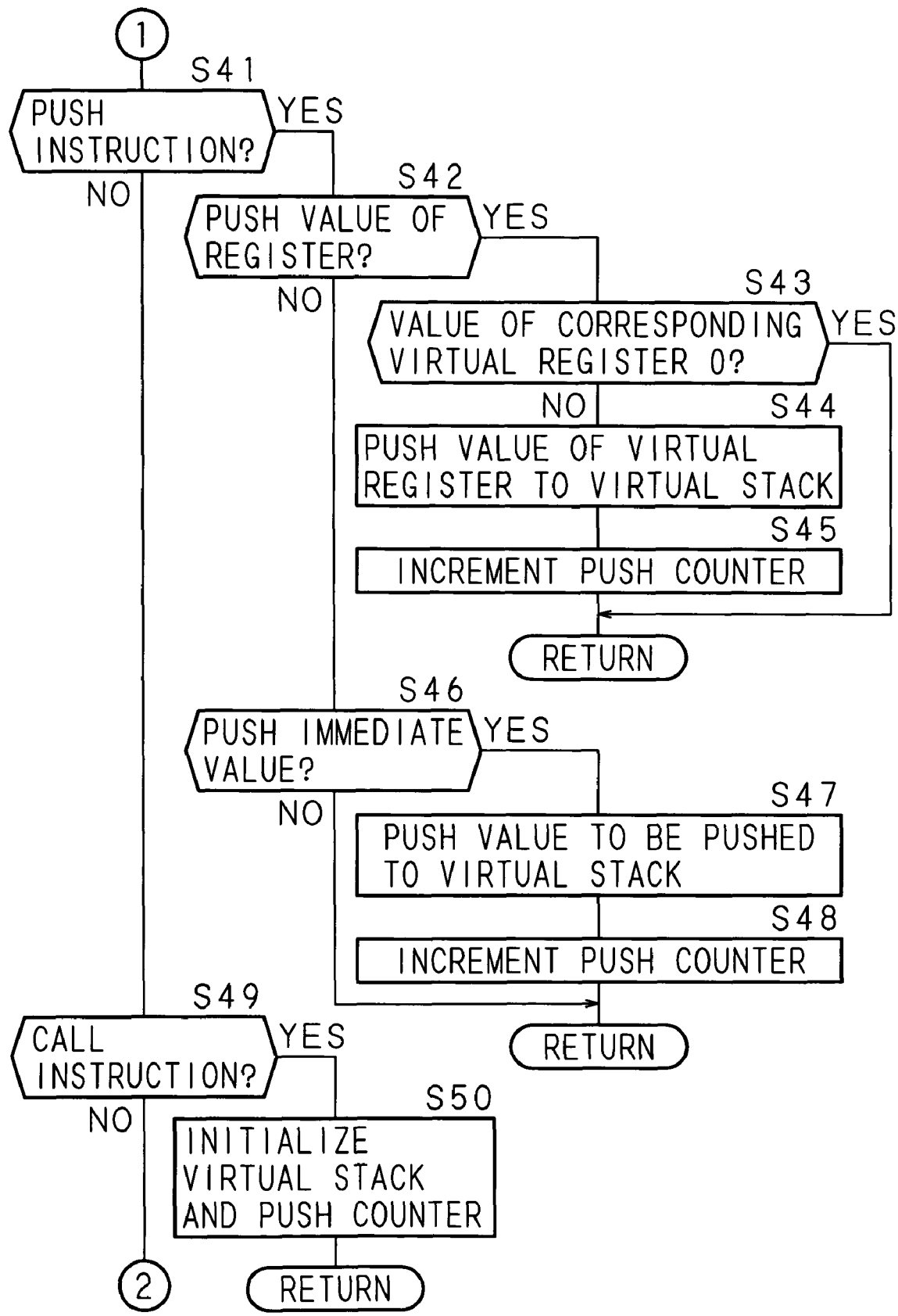
FIG. 10 is a flowchart for explaining the procedure of the analysis process routine.
Figure 11:
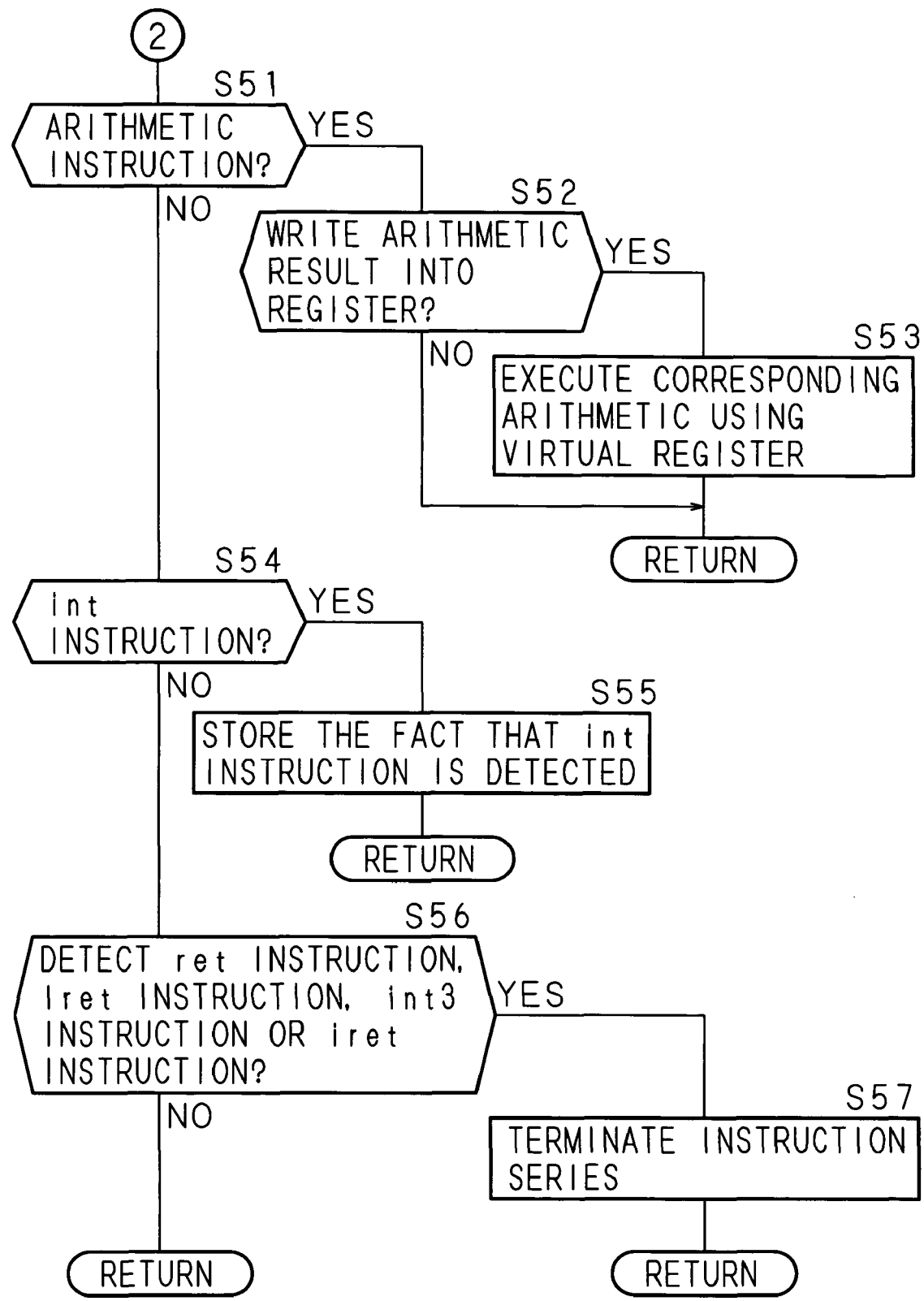
FIG. 11 is a flowchart for explaining the procedure of the analysis process routine.

FIG. 9 to FIG. 11 show flowcharts for explaining the procedure of the analysis process routine. The CPU 11 of the data processing apparatus 10, with reference to the above mentioned instruction table, determines whether the instruction code starting from the one byte of data read from the buffer memory 13 is the mov instruction or not (step S31). When decided as the mov instruction (S31: YES), a decision is made whether it is the reading of the immediate value into the register with reference to the parameter used in the mov instruction (step S32). When decided as the reading of the immediate value to the register (S32: YES), the immediate value is stored in the virtual register of the virtual CPU execution environment section 11a (step S33), and the process is returned to the analysis and determination process routine.

When decided as not the reading of the immediate value to the register (S32: NO), a decision is made whether it is the reading of a value of the memory to the register (Step S34). When decided as the reading of the value of the memory to the register (S34: YES), 0 is stored to the corresponding virtual register (step S35), and the process is returned to the analysis and determination process routine.

When decided as not the reading of the value of the memory to the register (S34: NO), a decision is made whether it is the reading of the value of the register to the register (step S36). When decided as the reading of the value of the register to the register (S36: YES), the value of the virtual register is stored in the corresponding virtual register (step S37), and the process is returned to the analysis and determination process routine. When decided as not the reading of the value of the register (S36: NO), the process is also returned to the analysis and determination process routine.

In step S31, when decided as not the mov instruction (S31: NO), a decision is made whether the instruction code starting from the one byte of data read from the buffer memory 13 is the lea instruction (step S38). The lea instruction is an instruction for loading the effective address. When decided as the lea instruction (S38: YES), a decision is made whether it results in reading the immediate value by the lea instruction (step S39). When resulting in reading the immediate value (S39: YES), the immediate value is stored in the corresponding virtual register (step S40), and the process is returned to the analysis and determination process routine. Further, when not resulting in reading the immediate value (S39: NO), the process is returned to the analysis and determination process routine.

In step S38, when decided as not the lea instruction (S38: NO), a decision is made whether the instruction code starting from the one byte of data read from the buffer memory 13 is the push instruction (step S41). When decided as the push instruction (S41: YES), with reference to the parameter used in the push instruction, a decision is made whether to push the value of the register (step S42). When pushing the value of the register (step S42: YES), a decision is made whether the value of the corresponding virtual register is 0 (step S43). When the value of the corresponding virtual register is 0 (S43: YES), the process is returned to the analysis and determination process routine. When the value of the corresponding virtual register is not 0 (S43: NO), the value of the virtual register is pushed to the virtual stack (step S44). The push counter is then incremented by 1 (step S45), and the process is returned to the analysis and determination process routine. The push counter is a counter for counting the number of times for pushing to the virtual stack.

Further, when decided to not push the value of the register in step S42 (S42: NO), a decision is made whether to push the immediate value (step S46). When pushing the immediate value (S46: YES), the value to be pushed is pushed to the virtual stack (step S47), and the push counter is incremented by 1 (step S48). The process is then returned to the analysis and determination process routine. When decided not to push the immediate value (S46: NO), the process is returned to the analysis and determination process routine.

When decided as not to be the push instruction in step S41, (S41: NO), a decision is made whether the instruction code started from the one byte of data read from the buffer memory 13 is the call instruction (step S49). When decided as the call instruction (S49: YES), the virtual stack and the push counter are initialized (step S50) and the process is returned to the analysis and determination process routine.

When decided as not to be the call instruction in step S49 (S49: NO), a decision is made whether the instruction code starting from the one byte of data read from the buffer memory 13 is the arithmetic instruction (step S51). The instruction relating to arithmetic operation, and instruction relating to logical operation are contained in the arithmetic instruction to be detected. When decided as the arithmetic instruction (S51: YES), a decision is made whether to write the arithmetic result by the arithmetic instruction to the register (step S52). When decided to write the arithmetic result to the register (S52: YES), the corresponding arithmetic instruction is executed using the virtual register (step S53), and the process is returned to the analysis and determination process routine. When not writing the arithmetic result to the register (S52: NO), the process is returned to the analysis and determination process routine.

When decided as not the arithmetic instruction in step S51, (S51: NO), a decision is made whether the instruction code starting from the one byte of data read from the buffer memory 13 is the int instruction (step S54). When decided as the int instruction (S54: YES), the fact that the int instruction is detected is stored in the memory 12 (step S55), and the process is returned to the analysis and determination process routine.

When the int instruction is detected when the push counter is greater than 1, the probability that the above mentioned shell code or the character code representing the parameter to be passed to the system call is generated becomes high, and thus the instruction series is considered to have ended in the decision of step S22 of the following analysis and determination process routine, and the determination process (S23) is performed.

When decided as not to be the int instruction in step S54 (S54: NO), a decision is made whether the instruction code starting from the one byte of data read from the buffer memory 13 is any one of ret instruction, lret instruction, int3 instruction or iret instruction (step S56). Any one of theses instructions represent the instruction for returning the control from the routine of the calling destination to the routine of the calling source. When being any one of the above mentioned instructions (S56: YES), the instruction series currently being analyzed is terminated (step S57), and the process is returned to the analysis and determination process routine. Further, when decided as none of the above mentioned instructions (S56: NO), the process is returned to the analysis and determination process routine without terminating the instruction series.

Figure 12:
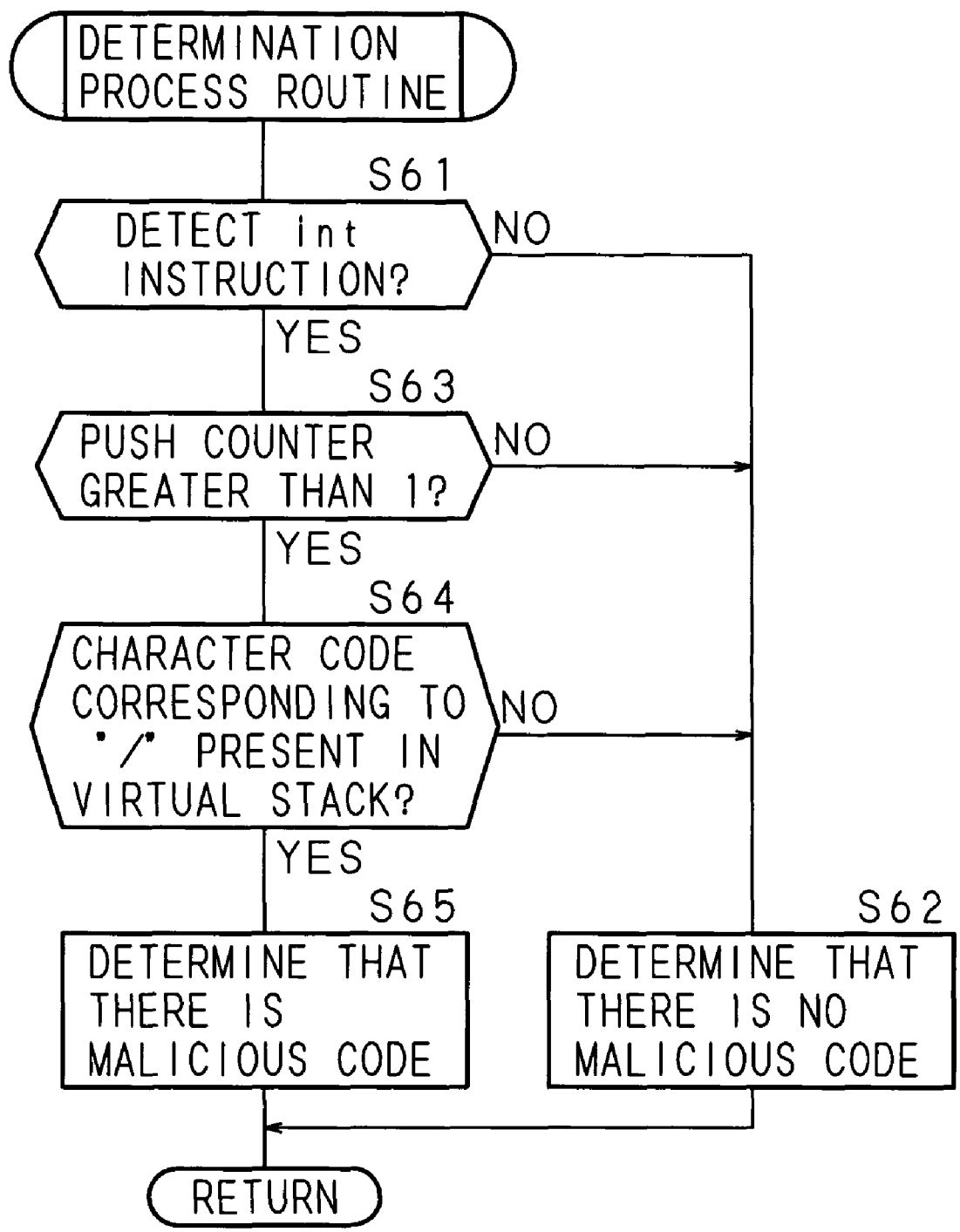
FIG. 12 is a flowchart for explaining the procedure of the determination process routine.

FIG. 12 is a flowchart for explaining the procedure of the determination process routine. The CPU 11 of the data processing apparatus 10 determines whether the int instruction is detected in the instruction series terminated by the above mentioned analysis process routine (step S61). When the int instruction is not detected (S61: NO), the external command is not executed with the system call called out by the interrupting process, and thus is determined that the malicious code is not present (step S62).

When the int instruction is detected in the instruction series terminated by the analysis process (S61: YES), the CPU 11 determines whether the push counter is greater than 1 (step S63). When decided that the push counter is 0 or 1 (S63: NO), the character string of the external command name that an attacker intends to execute is considered as not generated, and thus is determined that the malicious code is not present (S62).

When decided that the push counter is greater than 1 (S63: YES), a decision is made whether the character code corresponding to the "/" representing the delimiter of the pass is in the virtual stack (step S64). When the character code is not in the virtual stack (S64: NO), it is determined that the malicious code is not present (S64). Further, when the character code is in the virtual stack (S64: YES), the probability that the external command is executed with the system call called out by the interrupting process is decided to be high, and thus is determined that the malicious code is present (step S65).

In the present embodiment, a decision is made whether the "/" representing the delimiter of the pass of the external command is in the virtual stack to enhance the detection precision of the malicious code for collateral evidence, but decision may be made if the character string of some kind of external command is generated at the step the push counter is detected to be greater than 1 in step S63 to make a determination that the malicious code is present. Therefore, when use in the environment the detection precision is required is expected, the collateral evidence in step S64 is further performed, and when use in the environment the detection precision is not required is expected, the collateral evidence in step S64 may be omitted.

In the present embodiment, "/" is given as an example of a character code representing the delimiter of the pass, but in a different type of CPU to be protected, "¥" may be used as the character code representing the delimiter of the pass, and thus the character code used in collateral evidence is not necessarily limited to "/" and must be set in advance according to the type of CPU to be protected.

Second Embodiment

Although a form in which the present invention is applied to a relay device, such as a router, a broadband router or a switch, to be used for data communication has been explained in the First Embodiment, the present invention can be applied to an information processing apparatus having a communication function such as a personal computer, a server apparatus, a mobile telephone and a PDA.

Figure 13:
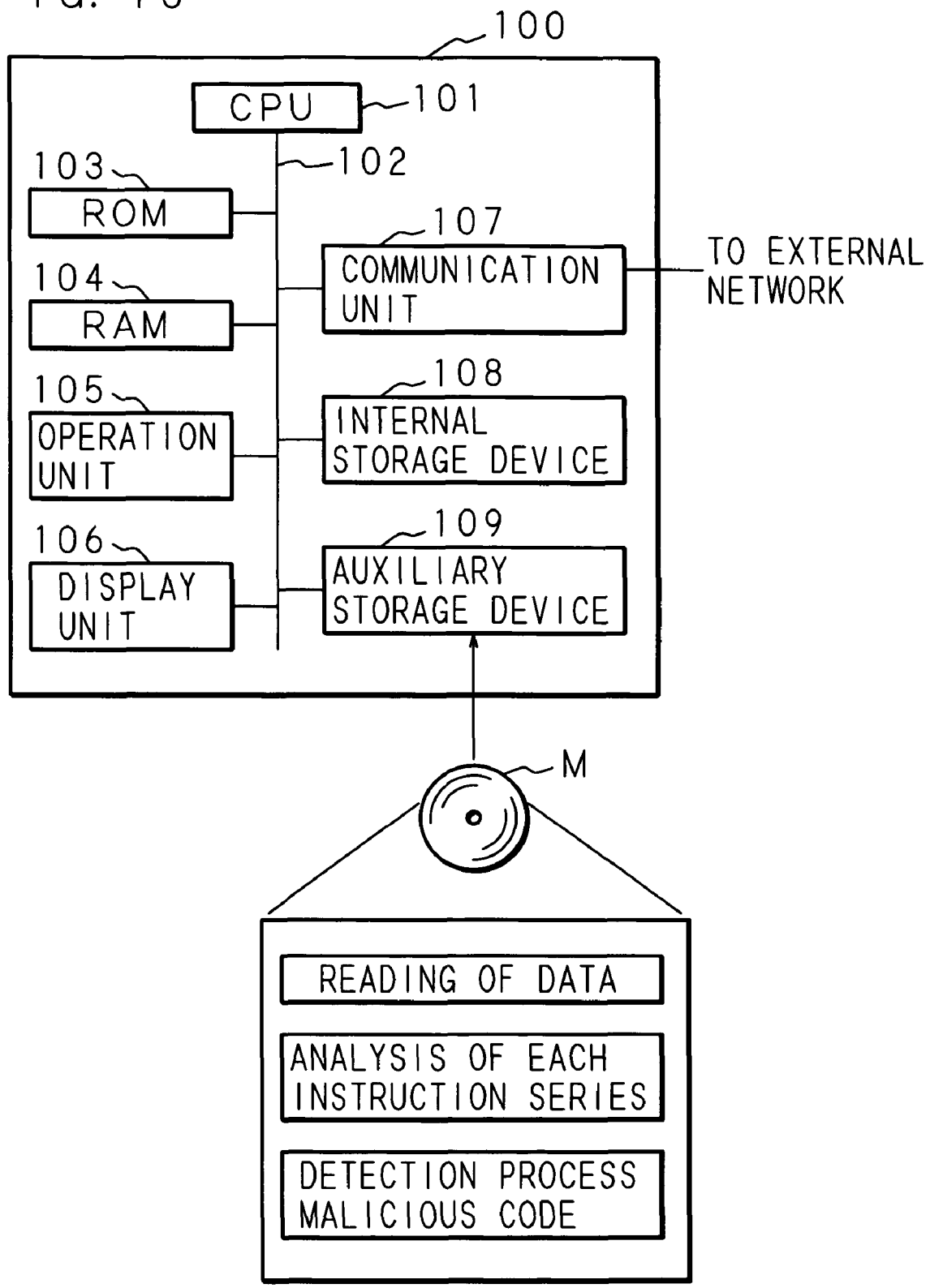
FIG. 13 is a schematic view for explaining the structure of a data processing apparatus according to the present embodiment.

FIG. 13 is a schematic view for explaining the structure of a data processing apparatus according to the present embodiment. Denoted at 100 in the figure is an information processing apparatus such as a personal computer, which comprises a CPU 101 and is connected with various kinds of hardware such as a ROM 103, a RAM 104, an operation unit 105, a display unit 106, a communication unit 107, an internal storage device 108 and a auxiliary storage device 109 via a bus 102. The CPU 101 controls the hardware according to a control program stored in the ROM 103. The RAM 104 is constituted of a SRAM, a flash memory or the like and receives data to be generated in execution of a control program stored in the ROM 103 and various kinds of data from an external network which is received via the communication unit 107.

The operation unit 105 is an input device such as a keyboard or a mouse, and the display unit 106 is a display device such as a CRT or a liquid crystal display device. The operation unit 105 and the display unit 106 are used for inputting and displaying data to be transmitted, for example. The communication unit 107 comprises a network termination unit such as a modem and controls transmission and receipt of various kinds of data to be transmitted to or received from the external network.

The auxiliary storage device 109 is constituted of an FD drive, a CD-ROM drive or the like for reading a computer program or the like from a record medium M such as an FD or a CD-ROM for recording a computer program or the like of the present invention, and the read computer program is stored in the internal storage device 108. The computer program stored in the internal storage device 108 is read into the RAM 104 and executed arbitrarily according to an indication from the CPU 101. By executing a computer program of the present invention by the CPU 101, the information processing apparatus 100 functions as an apparatus for detecting a malicious code from data received at the communication unit 107.

The computer program described above is preferably a resident program to be read automatically to the RAM 104 when the information processing apparatus 100 is activated, so that a malicious code is detected automatically when data from outside is received at the communication unit 107. It should be noted that the detection procedure of a malicious code is the same as the one explained in the First Embodiment and explanation thereof will be omitted.

It should be noted that, although a computer program of the present invention has been explained as a form to be provided by the record medium M, the computer program may be provided by communication means via the communication unit 107.

Moreover, although the present embodiment is constructed to detect a malicious code using the information processing apparatus 100 such as a personal computer, it should be understood that the present invention can be applied to a mobile telephone, a PDA, a computer game machine, an in-car communication device and various kinds of home information appliances in addition to a personal computer.

Moreover, the present invention can be also provided as an application software package for detecting computer virus, by providing a computer program of the present invention which is recorded in a record medium such as an FD or a CD-ROM.

INDUSTRIAL APPLICABILITY

According to the present invention, when sequentially reading the data from the storing means by one byte and determining whether the instruction code that executes a malicious process is contained therein, with regards to a plurality of data series having different read addresses, detection is made whether to generate the character string used when executing the malicious process such as, external command and parameter to be passed to the system call. Therefore, by performing detection focusing on the universal structure that is not seen in the usual data (executable code), the unknown malicious code, when appeared, could be responded to as long as the essential processing content of the malicious code is not changed. In the present invention, detection is performed for every instruction code, and thus the detection result may differ depending on where the starting position of the detection is set, but since detection is performed on a plurality of data series, which read position is sequentially differed, the erroneous determination is reduced and the detection precision is enhanced.

According to the present invention, since a table storing the correspondent relationship between the data of the first byte of the instruction code and the byte length of the instruction code is provided, when the read address of the data is positioned at a position other than the first byte of the instruction code in an instruction series, detection of the malicious code is not performed and thus the processing speed is improved.

According to the present invention, detection of whether the instruction code that activates the system call is contained after the instruction code that executes the process for generating the character string is performed, the parameter made up of the generated character code is most probably passed to the system call, and thus is determined that the instruction code that executes the malicious process is contained.

According to the present invention, determination is made whether a predetermined character code is contained in the generated character code, and thus the detection precision is enhanced.

According to the present invention, the character code to be generated is corresponded to the immediate value in the data, and thus by monitoring the register region and the stack region, the presence of malicious code is easily detected, and the detection precision is enhanced.

According to the present invention, when determined that the detected data sequence is the data that executes a malicious process, such fact is externally notified. Therefore, at the point the malicious code is detected, shutting of communication and the like is performed, thereby preventing disadvantages caused by the malicious code.

The invention claimed is:

1. A malicious-process-determining method for determining whether or not a malicious process is executed based on instruction codes included in received data, using a data processing apparatus comprising a receiving unit for receiving data including a plurality of instruction codes having different byte lengths and a storing unit for storing received data, comprising the steps of:

sequentially reading data one-byte by one-byte from a top storage location of an instruction stack in the storing unit; and in response to the reading of each data byte in the instruction stack, performing a determination as to whether a data sequence composed of a contiguous sequence of byte strings terminating at that data byte is used for executing the malicious process before the next data byte is read from the instruction stack, the determination being performed by:

detecting whether instruction codes that are contained in the data sequence generate a plurality of character codes configuring a character string used for executing the malicious process, and determining whether an external command, which is described by the character string, would be executed, wherein a determination is made as to whether or not the instruction stack contains a continuous sequence of byte strings which is used for executing the malicious process without re-reading of any of the data bytes from the instruction stack.

2. A data processing apparatus comprising a receiving unit for receiving data including a plurality of instruction codes having different byte lengths, a storing unit for storing received data, and a processor for determining whether or not a process to be executed is a malicious process based on the instruction codes included in stored data, the processor being programmed to:

sequentially read data one-byte by one-byte from a top storage location of an instruction stack in the storing unit; and in response to the reading of each data byte in the instruction stack, perform a determination as to whether a data sequence composed of a contiguous sequence of byte strings terminating at the data byte is used for executing the malicious process before the next data byte is read from the instruction stack, the determination being performed by:

detecting whether instruction codes that are contained in the data sequence generate a plurality of character codes configuring a character string used for executing the malicious process, and determining whether an external command, which is described by the character string, would be executed, wherein a determination is made as to whether or not the instruction stack contains a continuous sequence of byte strings which is used for executing the malicious process without re-reading of any of the data bytes from the instruction stack.

3. The data processing apparatus according to claim 2, further comprising a table storing the relationship between data of a first byte of an instruction code and byte length of the instruction code.

4. The data processing apparatus according to claim 2, wherein the processor is further programmed to detect whether an instruction code for activating a system call is located after the instruction code for generating the character codes, wherein when the instruction code for activating the system call is detected, the processor determines that the malicious process would be executed.

5. The data processing apparatus according to claim 4, wherein the processor is further programmed to detect whether a predetermined character code is contained in the character codes, wherein when the predetermined character code is detected, the processor determines that the malicious process would be executed.

6. The data processing apparatus according to claim 2, wherein the character code generated by the instruction code contained in the data sequence corresponds to an immediate value contained in the data.

7. The data processing apparatus according to claim 2, wherein the processor is further configured to notify information to the outside when determining that the malicious process would be executed.

8. A data processing apparatus comprising:

a receiving section for receiving data including a plurality of instruction codes having different byte lengths;

a memory for storing received data; and a controller capable of performing operations of:

sequentially reading data one-byte by one-byte from a top storage location of an instruction stack in the memory; and in response to the reading of each data byte in the instruction stack, performing a determination as to whether a data sequence composed of a contiguous sequence of byte strings terminating at that data byte is used for executing the malicious process before the next data byte is read from the instruction stack, the determination being performed by:

detecting whether instruction codes that are contained in the data sequence generate a plurality of character codes configuring a character string used for executing the malicious process, and determining whether an external command which is described by the character string would be executed, wherein a determination is made as to whether or not the instruction stack contains a continuous sequence of byte strings which is used for executing the malicious process without re-reading of any of the data bytes from the instruction stack.

9. The data processing apparatus according to claim 8, wherein said controller is further capable of performing an operation of detecting whether an instruction code for activating a system call is located after the instruction code for generating the character codes.

10. The data processing apparatus according to claim 9, wherein said controller is further capable of performing an operation of detecting whether a predetermined character code is contained in the character codes.

11. A computer-readable recording medium recorded a computer program comprising a step of causing a computer to determine whether or not a malicious process is executed based on data including a plurality of instruction codes having different byte lengths, wherein the recorded computer program comprising the steps of:

causing the computer to sequentially read data one-byte by one-byte from a top storage location of an instruction stack in a storing unit of the computer; and causing the computer to perform a determination, in response to the reading of each data byte in the instruction stack, as to whether a data sequence composed of a contiguous sequence of byte strings terminating at that data byte is used for executing the malicious process before the next data byte is read from the instruction stack, the determination being performed by detecting whether instruction codes that are contained in the data sequence generate a plurality of character codes configuring a character string used for executing the malicious process, wherein a determination is made by the computer as to whether or not the instruction stack contains a continuous sequence of byte strings which is used for executing the malicious process without re-reading of any of the data bytes from the instruction stack.

* * * * *